Figure 1:
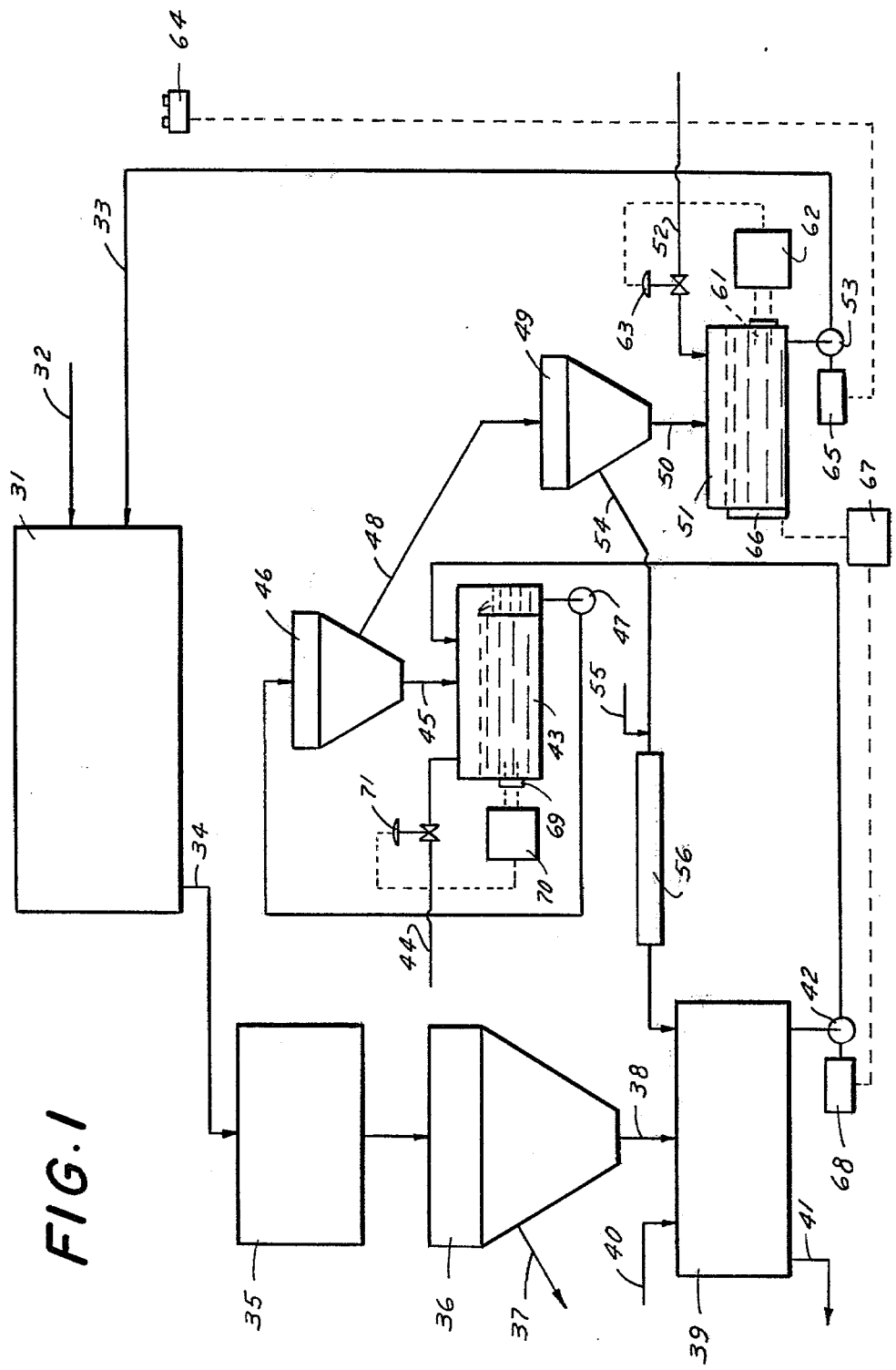

United States Patent [19]

Mercier

[11] 4,339,280
[45] * Jul. 13, 1982

[54] PROCESS OF PRODUCING A SEEDING MAGMA FOR SEEDING A SOLUTION OF A CRYSTALLIZABLE PRODUCT

[75] Inventor: Andre Mercier, La Madeleine, France

[73] Assignee: Fives-Cail Babcock, Paris, France

[*] Notice: The portion of the term of this patent subsequent to Aug. 14, 1996, has been disclaimed.

[21] Appl. No.: 189,338

[22] Filed: Sep. 22, 1980

Related U.S. Application Data

[62] Division of Ser. No. 15,173, Feb. 26, 1979, abandoned, which is a division of Ser. No. 860,043, Dec. 13, 1977, Pat. No. 4,164,429.

[30] Foreign Application Priority Data

Dec. 14, 1976 [FR] France .................................. 76 37581

[51] Int. Cl.³ ............................ C13F 1/02; C13F 1/06; C13F 1/12
[52] U.S. Cl. ......................................... 127/56; 127/60; 127/61; 127/62
[58] Field of Search ........................ 127/19, 60, 62, 56, 127/15, 16

[56] References Cited

U.S. PATENT DOCUMENTS

| 3,490,947 | 1/1970 | Grieselhuber | 127/19 |
| 3,567,513 | 3/1971 | Hansen | 127/62 |
| 3,582,399 | 6/1971 | Black | 127/62 |
| 3,706,599 | 12/1972 | Woodruff | 127/62 |
| 4,162,927 | 7/1979 | Alvarez | 127/62 |
| 4,164,429 | 8/1979 | Mercier | 127/16 |

Primary Examiner—Michael S. Marcus
Attorney, Agent, or Firm—Kurt Kelman

[57] ABSTRACT

A seeding magma for seeding a solution of a crystallizable product is prepared from a suspension the crystals in a liquid phase. This suspension is delivered into a continuously rotating conical basket of a centrifugal drier. The basket has an upper output end and a screen is mounted therein. Rotation of the basket causes the suspension to be subjected to centrifugal forces causing crystals of a size interior to the mesh size of the screen to pass with the liquid phase through the screen and larger crystals to be retained on the screen and centrifugally displaced towards the upper output end and ejected therefrom. These crystals are forcefully projected against an impact surface disposed around the output end of the basket whereby the projected crystals are crushed on impact with the surface. The crushed crystals are recycled into the suspension delivered into the basket while the liquid phase with the crystals passed through the screen is removed for preparing the seeding magma.

1 Claim, 2 Drawing Figures

PROCESS OF PRODUCING A SEEDING MAGMA FOR SEEDING A SOLUTION OF A CRYSTALLIZABLE PRODUCT

This is a divisional application of U.S. application Ser. No. 15,173, filed Feb. 26, 1979, now abandoned which is a divisional application of U.S. application Ser. No. 860,043, filed Dec. 13, 1977, now U.S. Pat. No. 4,164,429.

The present invention relates to a process of producing a seeding magma for seeding a solution of a crystallizable product, such as sugar.

A crystallizing apparatus, which has as its object the extraction of the mother liquor and the production of crystals of a predetermined dimension, must initially be fed with a suitable number of crystallization seeds to assure the realization of these conditions. When the apparatus is for continuous production, the number of seeds delivered must be proportional to the output of the apparatus.

This first crystallization phase, which consists of the introduction of seeds and the beginning of their growth, is difficult to effectuate, considering the very small size of the introduced seeds and the risk of significant variations in the initial crystal population by local remelting of fines (crystals of very small dimensions) or by agglomerations.

The invention has as object a process for the continuous production of a seeding magma which permits feeding a crystallization apparatus with a controllable population of crystals substantially proportional to the volume of the solution to be treated.

The process of the invention uses the crushing and screening of crystals in a humid state to form a magma.

The selection is made in a drier by passing a suspension of crystals in a liquid phase over a screen with large openings. The liquid phase entraining the crystals of small size is used for preparing the magma. The oversized crystals from the drier are crushed and then recycled.

The crushing of the sugar is effected by projecting the oversized crystals on an impact surface. A device is added to the drier to assure this function; it is constituted essentially by a receiving metal sleeve which is constantly cleaned by rotating wipers so disposed that the crystals are forcefully projected and subjected to an impact capable of breaking them. This manner of crushing has a selective action. In effect, the crystals are slowed down in their trajectories by the friction in the air. This slowing down is the more pronounced as the specific surface of the crystal is large and, therefore, its dimension is small. Starting with a given initial speed and the selected length of the trajectory, it is possible to collect the small crystals without breaking them while the large crystals retain an impact speed capable of causing their rupture.

Figure 2:
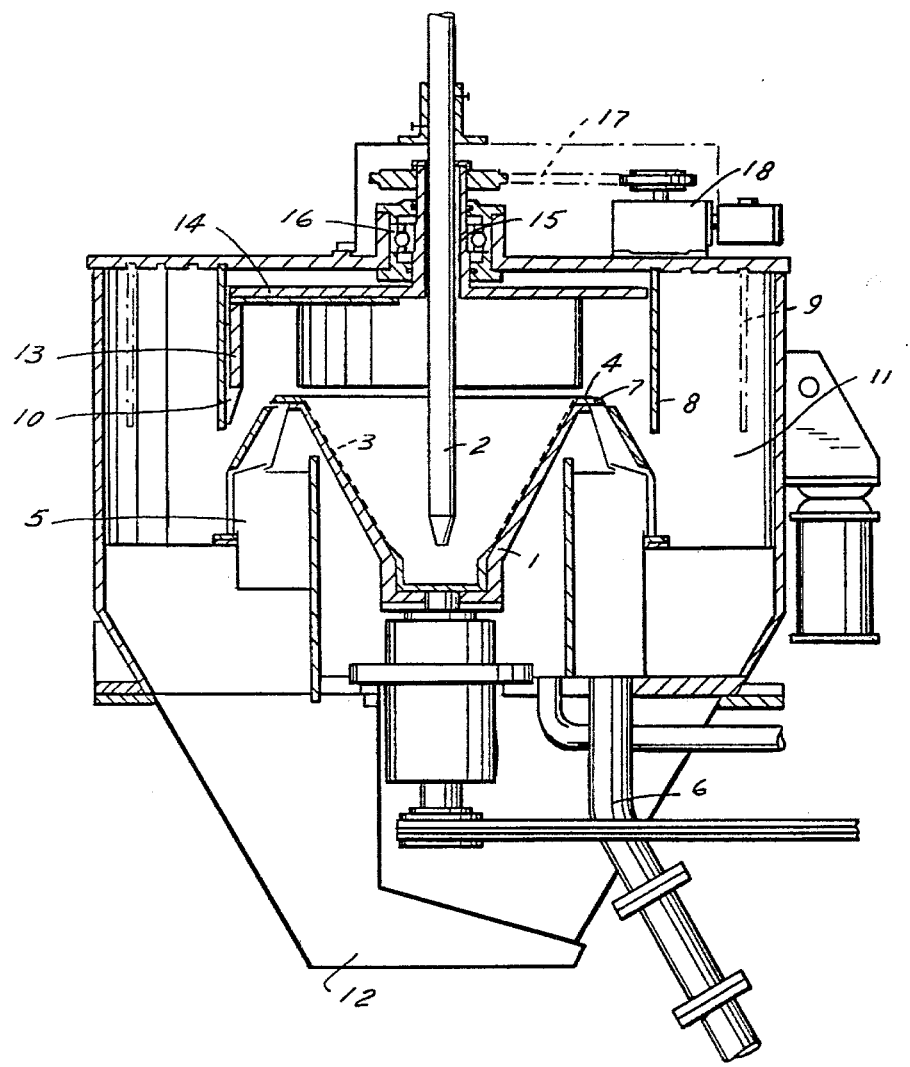

The following description refers to the accompanying drawing which illustrates the invention and wherein:

FIG. 1 is a schematic view of an installation incorporating the process of the invention, as applied to a continuously operating crystallizer; and FIG. 2 is an axial section of a drier for use in the installation of FIG. 1 and capable of producing the seed magma.

The schematic view in FIG. 1 shows the principle of a continuous crystallization of the third strike of a sugar refinery, with continuous delivery of selected crystallization seeds. It is understood that the details of the schematic view used for the understanding of the process in no way limit the scope of the process of this invention to sugar refining, nor is this process limited to the nature of the treated product or the type of apparatus described herein. To indicate the general character of the process, the sugar refinery terms are indicated in parentheses in the following description to exemplify the generic terms.

The schematic view of FIG. 1 shows a continuous crystallization apparatus 31 (continuous vacuum pan of the third strike) fed at 32 with a solution to be extracted (poor molasses of the second strike) and at 33 by a suspension of crystallization seeds (magma). In the apparatus, the solution is maintained at super-saturation by evaporation under vacuum, which leads to crystallizable material collecting on the crystallization seeds, which grow. The suspension of crystals (massecuite of the third strike) is removed at 34. The crystallization is followed by cooling in a mixer 35. The cooled product from mixer 35 is dried in a continuous centrifugal drier 36 which produces, on the one hand, a liquid phase 37 (molasses) and, on the other hand, crystals 38 (sugar from the third strike). These crystals fall into a mixer 39 whereinto a purer solution (low purity molasses of the second strike) is delivered at 40 to form a suspension (magma). This suspension is recycled at 41, either to obtain refined crystals or to serve as crystallization seeds at a stage of increased purity (continuous vacuum pan of the second strike). A part of the suspension is removed by a metering pump 42 to be directed to a mixer 43 and there to be mixed with a solution delivered at 44 and of the same nature as that utilized in the previously mentioned mixer, and with crushed products 45 coming from a continuous centrifugal drier 46 which will be described hereinbelow with reference to FIG. 2. This drier is designed to assure the impact crushing of crystals which are too large to pass through the openings of the screen of the drier.

In the case of sugar refineries where a remelting of the sugar of the third strike (in the particular case of beet sugar refineries) is effected directly, a controlled output of sugar crystals coming from drier 36 is introduced directly into mixer 43 before remelting.

The suspension obtained in the mixer 43 is recycled by a metering pump 47 to the drier 46. The crystals passing through the openings of the screen of this drier are removed at 48 with the liquid phase and are fed to a second continuous centrifugal drier 49. The crystals whose dimensions are larger than those of the openings of the screen of the drier 49, which are smaller than those of the screen of the drier 46, are removed at 50. They fall into a mixer 51 which receives at 52 a solution of the same purity (molasses of the second strike) as that whose extraction by crystallization is to be assured. The thus constituted magma is recycled by a metering pump 53 to be injected into the continuous crystallization apparatus (vacuum pan of the third strike). The crystals of dimensions smaller than the openings of the screen of drier 49 contained in the output 54 of the drier are remelted by injection of a small proportion of water at 55 and are reheated at 56, bringing the suspension to below saturation; the obtained solution is recycled to the mixer 39.

In the industrial realization of this process, the management may be facilitated by an automatic control. By way of non-limiting example, a preferred control will be described hereinafter.

The content of crystallization seeds in the magma in mixer 51 is measured by a conductivity meter 61. The measurement is transmitted to a control 62 which actuates a valve 63 disposed in conduit 52 in such a manner as to maintain this content equal to a fixed operating value.

By a manual control 64 acting upon the pump speed regulator 65, the output of the suspension of seeds (magma 3) extracted from mixer 51 is so controlled that a desired crystal population is obtained in the crystallizer. A level meter 66 acting upon the control 67 controls a governor 68 which adjusts the output of the pump 42 which removes the suspension of crystals (magma 2) from the mixer 39. A conductivity meter 69 acting upon the control 70 regulates the output of a valve 71 disposed in the conduit 44 so as to maintain the content of crystals in the magma in the mixer 43 constant.

The drier 46 shown in FIG. 2 is designed for carrying out the process of the present invention. It comprises a conical basket 1 continuously rotating at high speed and to which a suspension of crystals in a liquid phase is delivered through delivery tube 2. The conical basket has an upper output end defined by orifices 4 disposed at upper flange 7 of basket 1 and screen 3 is mounted in the basket. The rotation of conical basket 1 causes the suspension of crystals to be subjected to centrifugal forces. The mesh size of screen 3 is selected to retain crystals of a size larger than that of the desired crystals whereby crystals of a size inferior thereto are centrifugally forced to pass with the liquid phase of the suspension through the screen. The larger crystals are retained on the screen and are centrifugally displaced upwardly and ejected at the output end of the basket through orifices 4. The liquid phase containing the smaller crystals is collected in circular receptacle 5 whence it is removed through output pipe 6. The solid phase consisting of the larger crystals retained on screen 3 is ejected practically at the tangential rotary speed of basket 1 above flange 7 and is forcefully projected against an impact surface constituted by cylindrical metallic sleeve 8 disposed around the upper output end of conical basket 1. These forcefully projected crystals are crushed upon impacting on this surface and, as shown in FIG. 1, the crushed crystals are recycled to the suspension being delivered to centrifugal drier 46 by pump 47.

A certain number of metallic sleeves 8 of different diameters may be provided to permit the length of the trajectory to be selected as a function of the desired size of the crushed product, the sleeve 9 in chain-dotted lines being that of the largest diameter. The peripheral speed of the basket and the length of the trajectory are so selected that the largest projected crystals arrive at the sleeve with a speed such that they are crushed by the effect of the impact while the small crystals are slowed down by the friction in the air and are, therefore, not broken or are subjected only to partial crushing. The products, although energetically dried, are sticky in the pulverized state; to avoid an accumulation of the products, which would modify the crushing conditions of the crystals, the sleeve is cleaned by rotating wipers 10.

The number and the speed of rotation of these wipers are such that the impact conditions vary little. It would also be possible to use a rotating sleeve on which fixed wipers acted. The wipers are mounted on supports 13 fixed in operating position on platform 14 which entrains them into rotation. The entrainment shaft 15 of this platform is hollow so as to permit passage of the delivery tube; it is journaled in bearing 16 integral with the cover of the drier and is rotated by transmission 17 and a reduction motor assembly 18.

The crushed crystals fall into annular chamber 11 to be removed through orifice 12.

What is claimed is:

1. A process of producing a seeding magma for seeding a solution of a crystallizable product, which comprises the steps of delivering a suspension of crystals in a liquid phase into a continuously rotating conical basket of a centrifugal drier, the basket having an upper output end and a screen being mounted in the basket, rotation of the basket causing the suspension of crystals to be subjected to centrifugal forces whereby crystals of a size inferior to the mesh size of the screen are centrifugally forced to pass with the liquid phase through the screen and crystals of a size exceeding the mesh size of the screen are retained on the screen and centrifugally displaced towards the upper output end and ejected therefrom, and forcefully projecting the crystals ejected from the output end in a trajectory against an impact surface disposed around the output end of the rotating basket, the peripheral speed of the basket and the length of the trajectory being so selected that the projected crystals are crushed on impact with the surface, recycling the crushed crystals into the suspension delivered into the rotating conical basket, and removing the liquid phase with the crystals passed through the screen for preparing the seeding magma.

* * * * *